T. O. TAGGART.
PORTABLE POWER SAW.
APPLICATION FILED MAR. 21, 1912.
1,061,702.
Patented May 13, 1913.
3 SHEETS—SHEET 1.
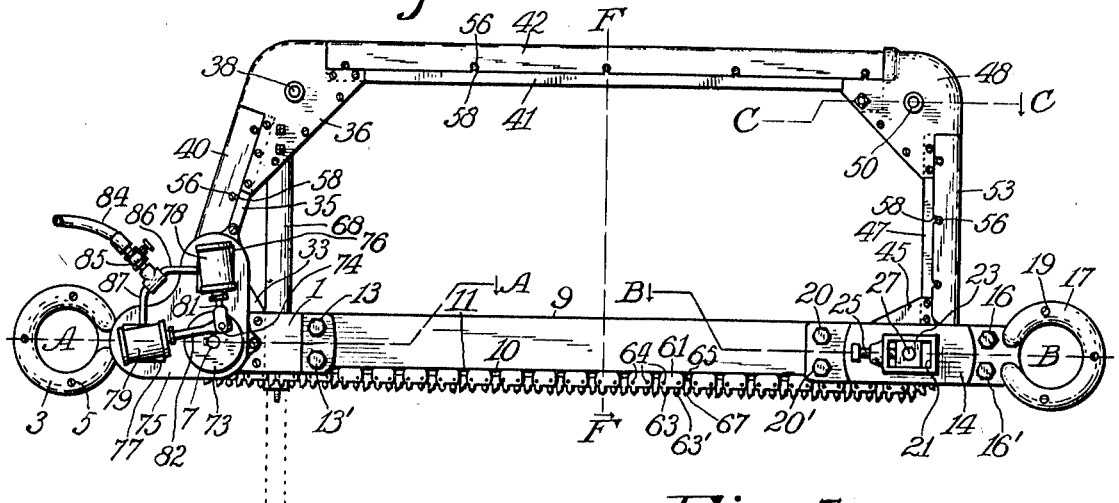
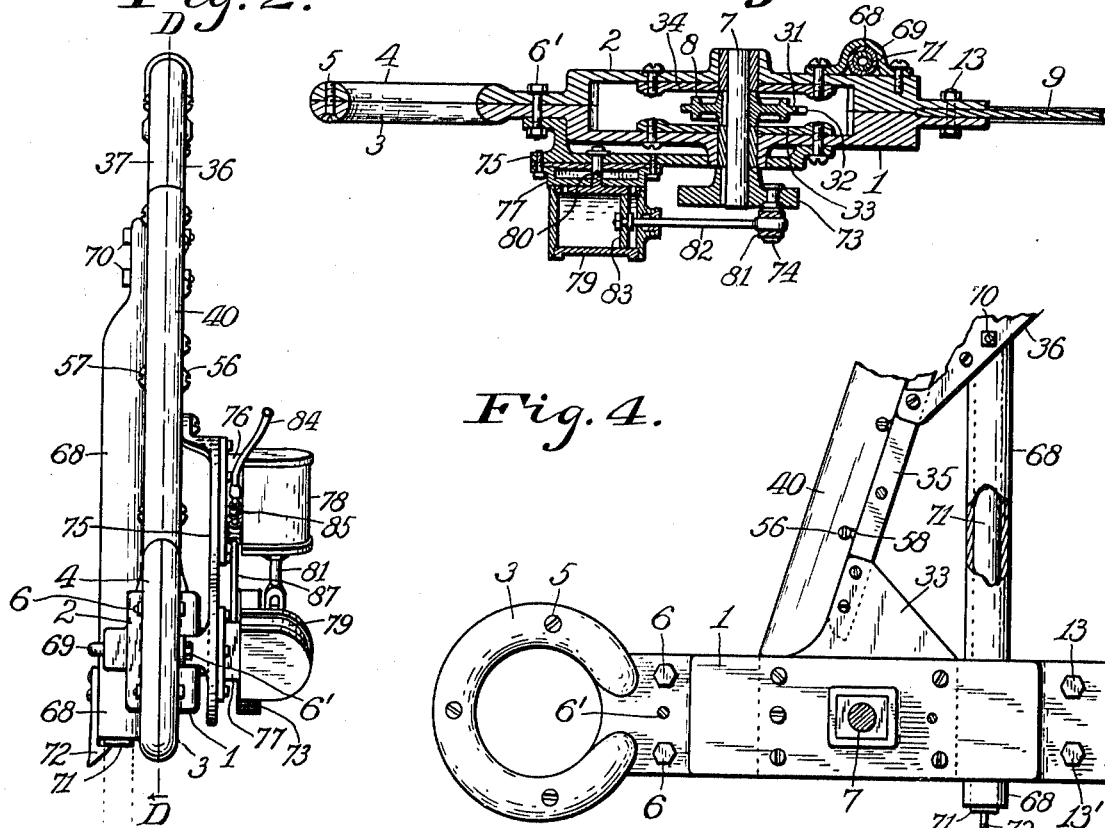
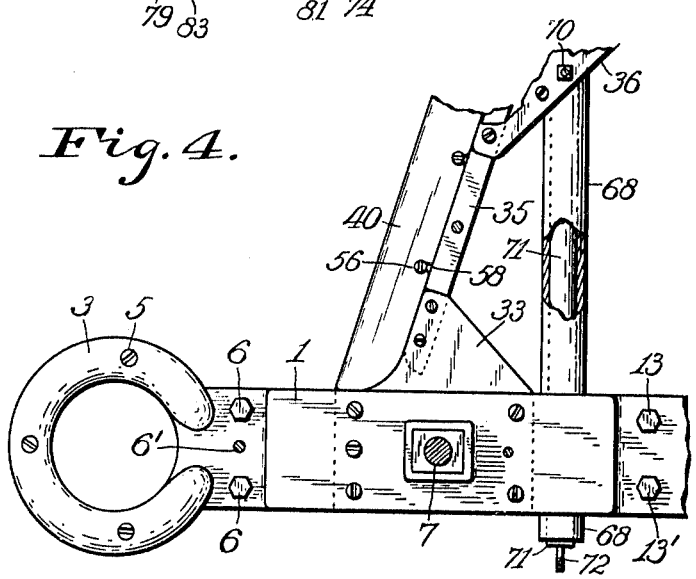
WITNESSES:
Alice R. Stogsdill.
G. M. Mapes.
INVENTOR:
Thomas O. Taggart,
BY E. T. Silvius.
ATTORNEY.

T. O. TAGGART.
PORTABLE POWER SAW.
APPLICATION FILED MAR. 21, 1912.
1,061,702. Patented May 13, 1913.
3 SHEETS—SHEET 2.
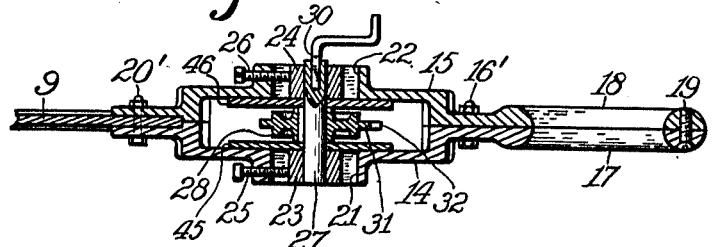
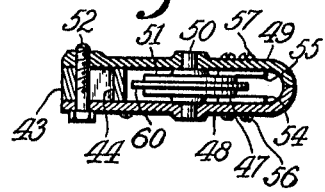
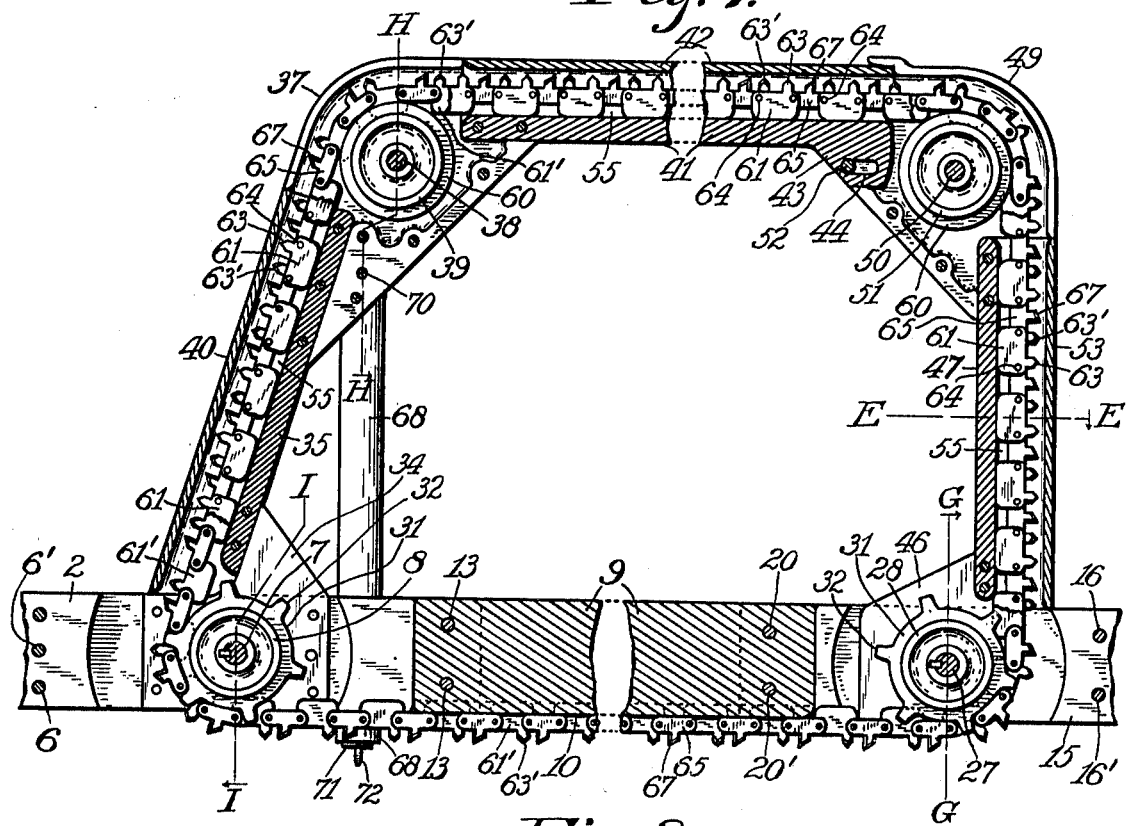
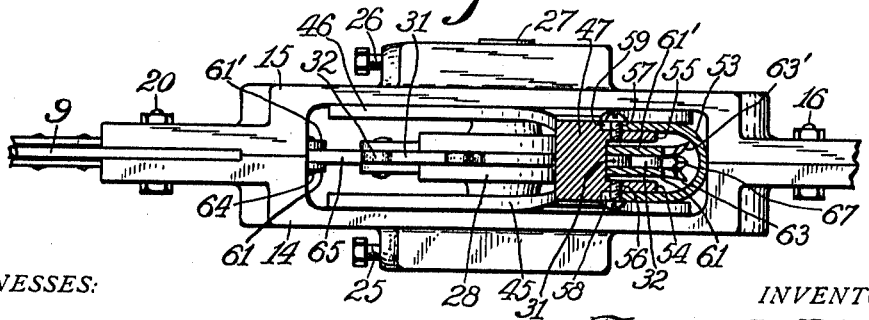
WITNESSES:
Alice R. Stogsdill.
G. M. Mapes.
INVENTOR:
Thomas O. Taggart,
BY
E. T. Silvius,
ATTORNEY.

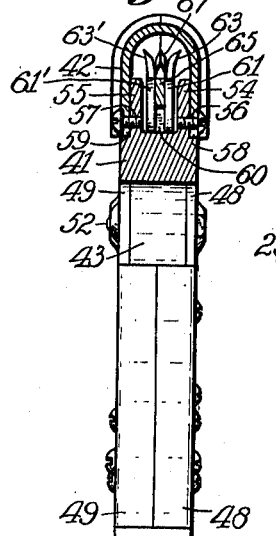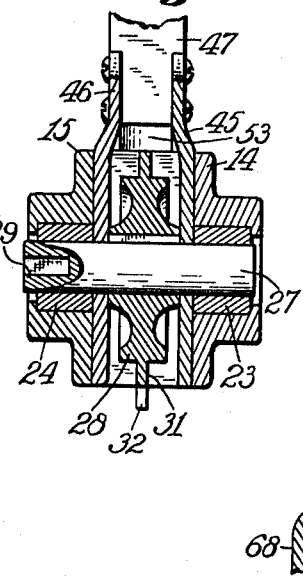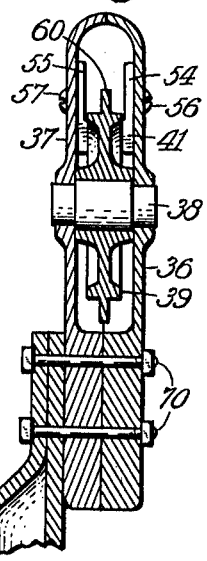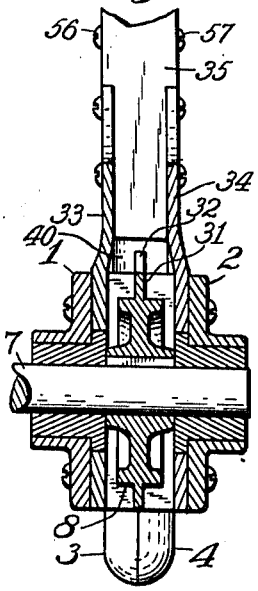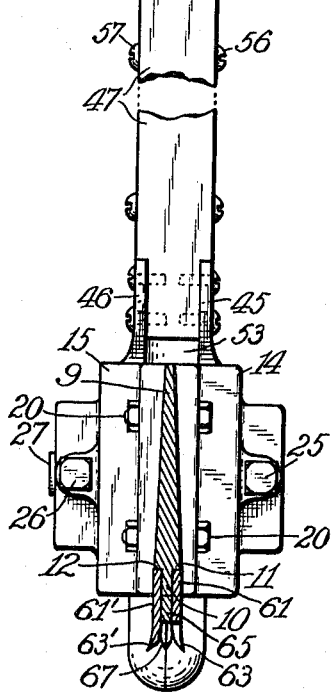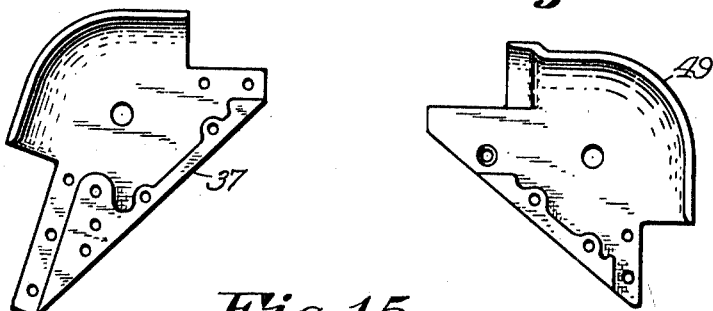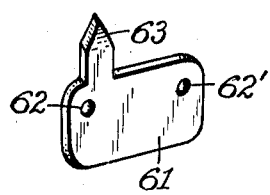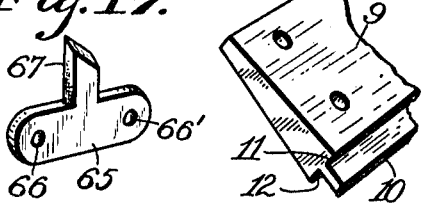

UNITED STATES PATENT OFFICE.

THOMAS O. TAGGART, OF MORRISTOWN, INDIANA, ASSIGNOR OF ONE-FOURTH TO OMER L. STULTZ, OF ZIONSVILLE, INDIANA.

PORTABLE POWER-SAW.

1,061,702.  Specification of Letters Patent.  Patented May 13, 1913.

Application filed March 21, 1912. Serial No. 685,195.

*To all whom it may concern:*

Be it known that I, THOMAS O. TAGGART, a citizen of the United States, residing at Morristown, in the county of Shelby and State of Indiana, have invented a new and useful Portable Power-Saw, of which the following is a specification, reference being had to the accompanying drawings and to the letters and figures of reference marked thereon.

This invention relates to the type of sawing machine that is designed to be manually carried about and used as a cross-cut saw for felling timber in the forests and for sawing the trees or logs into short lengths, the invention having reference more particularly to a chain saw and frame therefor, and to means for operating the saw by the use of either compressed air or steam.

The object of the invention is to provide an improved portable power saw that shall be so constructed as to be of light weight in order that it may be readily handled and controlled by a small number of workmen.

A further object is to provide an improved saw frame that shall be adapted to constitute a guide and a saw guard combined, and adapted to carry an engine thereon for driving the saw.

An equally important object of the invention is to provide an efficient, durable and economical portable power sawing machine for the above mentioned and other purposes.

The invention comprises a chain saw, a novel combined controlling frame and guard for the saw, and an improved engine and gearing for driving the saw; and the invention consists further in the novel parts and in the combinations and arrangements of parts as hereinafter particularly described and claimed.

Referring to the drawings, Figure 1 is a plan of the improved sawing machine, being considered as in horizontal position for cutting down a tree; Fig. 2, an end elevation of the machine as when in upright position for cutting a horizontal log; Fig. 3, a fragmentary section on the line A A in Fig. 1; Fig. 4, a fragmentary reproduction of a portion of Fig. 1 on an enlarged scale; Fig. 5, a fragmentary section on the line B B in Fig. 1; Fig. 6, a fragmentary section on the line C C in Fig. 1; Fig. 7, a fragmentary section on the line D D in Fig. 2; Fig. 8, a fragmentary section on the plane of the line E E in Fig. 7; Fig. 9, a section on the line F F in Fig. 1; Fig. 10, a fragmentary section on the plane of the line G G in Fig. 7; Fig. 11, a fragmentary section on the planes of the line H H in Fig. 7; Fig. 12, a fragmentary section on the planes of the line I I in Fig. 7; Fig. 13, an internal plan view of one of the frame parts; Fig. 14, an internal plan view of another one of the frame parts; Fig. 15, a fragmentary front edge view of the chain saw; Fig. 16, a perspective view of one of the interchangeable and reversible links of the chain saw provided with a cutting tooth; Fig. 17, a perspective view of the drag tooth and its carrying link, and Fig. 18, a fragmentary perspective view of the backing blade for supporting and guiding the portion of the saw that is in cutting position.

Similar reference characters throughout the different figures of the drawings indicate corresponding elements or features of construction herein referred to and described in detail.

As preferably constructed the machine frame comprises a head stock and a tail stock to which the backing blade is secured. The head stock preferably is composed of two identically shaped parts 1 and 2 which may be cast from one pattern and placed together in reverse order, the parts being suitably shaped so as to provide an opening in the head stock, and the two parts have handle rings 3 and 4 on one end thereof which when placed together constitute a convenient handle that is cylindrical in cross section, for carrying the head portion of the saw frame, the two parts of the handle being secured together by screws 5, the main portions of the parts being secured together by a suitable number of bolts 6, 6'. A drive shaft 7 is rotatably mounted in suitable bearings in the two parts of the head stock, a suitable drive wheel 8 being secured to the shaft in the opening provided in the head stock. A suitable backing blade 9 is provided, the front portion of the blade being thicker than the rear portion thereof and having a longitudinal guide rib 10 thereon which is relatively thin, so that two guide shoulders 11 and 12 are provided at the sides of the base of the rib. One end of the blade is removably secured to the opposite inner end of the head stock by means of bolts 13, so that the blade extends substantially in alinement with the head stock.

The tail stock comprises two parts 14 and 15 which may be cast from one pattern and placed together in reverse order and secured together by means of a suitable number of bolts 16, 16', and these parts are so shaped as to form an opening in the tail stock, and handle rings 17 and 18 are formed on one end of the two parts and secured together by means of screws 19 so as to form a handle similar to the handle on the head stock. The opposite end of the tail stock is secured to the opposite end of the backing blade 9 by means of bolts 20, 20'. The two parts 14 and 15 have horizontally extending guideways 21, and 22 therein, respectively, in which two journal boxes 23 and 24 are adjustably mounted and normally seated against adjusting screws 25 and 26 respectively that are mounted in suitable projections on the outer sides of the tail stock parts, the screws being adapted to force the journal boxes in the direction away from the head stock, in order to take up lost motion in the joints of the chain saw. A shaft 27 is rotatably mounted in the journal boxes and a guide wheel 28 is secured to the shaft in the opening provided in the tail stock. One end of the shaft preferably has a squared socket 29 therein to receive a turning crank 30 for rotating the shaft and wheel in order to periodically move the chain saw while filing or dressing the teeth thereof. The peripheries of the wheels 8 and 28 are suitably shaped so as to enable the wheels to drive or move the chain saw, and preferably the peripheries of the wheels have each a circumferential guide rib 31 thereon from which extend a suitable number of sprocket teeth 32.

The remaining portion of the frame whereby to control the position of the saw, and for guiding and guarding that portion of the saw that is not in effective operation, is connected to the head stock and the tail stock. Preferably two frame plates 33 and 34 are rigidly secured to the two parts 1 and 2 respectively of the head stock or may be formed integrally therewith, the plates extending rearwardly, and a guide bar 35 is secured at one end thereof to the plates and extends away from the head stock at an acute angle to the backing blade, the opposite end of the bar having a wheel housing connected thereto comprising two parts 36 and 37 secured together and to the bar, the two parts supporting an axle 38 on which is a guide wheel 39 that is inclosed in the housing. A saw guard 40 which is approximately U-shaped in cross section is secured to the guide bar 35 and extends from the head stock nearly to the guide wheel, the housing of the guide wheel being suitably shaped so that a close connection is made between the guard and the housing, the housing being adapted to constitute also a stiffening corner brace of the frame. A guide bar 41 similar to but longer than the bar 35 is secured to the parts 36 and 37 of the housing and extends therefrom parallel to the back of the blade 9, and a guard 42 similar to the guard 40 is connected thereto and extends from the housing. The farther end of the bar 41 has a projection 43 thereon that extends inwardly or toward the blade 9 and it has a slot 44 therein that extends longitudinally of the guide bar. Two plates 45 and 46 are connected with the shaft 27 within the opening provided in the tail stock, so as to be moved longitudinally of the stock when the position of the shaft is readjusted, the plates extending rearwardly from the stock, and a guide bar 47 is secured at one end to the plates and extends rearwardly approximately at right angles to the tail stock and the blade 9, the opposite end of the guide bar having a wheel housing and saw guard combined connected thereto, the housing comprising two companion parts 48 and 49 secured together and to the guide bar and constitute a stiffening corner brace for the frame, the housing supporting a shaft 50 on which a guide wheel 51 is mounted and inclosed within the housing. The housing is adapted to receive the projection 43 and is provided with a binding bolt 52 that extends through the slot 44 for adjustably securing the housing to the end of the guide bar 41, so that the wheel 51 may be moved farther away from the wheel 39 when the wheel 28 is readjusted for taking up lost motion due to wear of the pivots connecting the links of the chain saw together. The parts 48 and 49 are so formed as to have telescopic connection with the guard 42 and also with the guide bar 41. A saw guard 53 is secured to the guide bar 47 and extends from the tail stock to the parts 48 and 49.

The guide bars 35, 41 and 47 are suitably formed so as to guide the chain saw and preferably have side guides 54 and 55 to form a channel in which the saw is guided. The guards 40, 42 and 53 are preferably secured to the guide bars by means of screws 56 and 57 inserted in opposite sides of the bars, the edges of the side portions of the guards having slots 58 and 59 therein to receive the screws so that the guards may be removed by slackening the screws, the heads of the screws securely holding the guards when the screws are tightened. Preferably the wheels 35 and 51 have each a circumferential guide rib 60 thereon forming lateral guides for the saw.

The chain saw comprises a suitable number of tooth links 61 and 61', all the links being alike so as to be interchangeable and reversible. Each link consists of a flat plate that has two pivot holes 62 and 62′, the holes being nearer to the front than to the rear edge of the link and a cutting tooth 63 is suitably formed on one end portion of the longer side or front edge of the link. The two links of each pair are placed in reverse order so that the cutting teeth are in staggered arrangement. Suitable pivots 64 connect the ends of the links to links or blocks 65 which are narrower than the links 61 or 61′ and have pivot holes 66 and 66′ in opposite ends thereof to receive the pivots. The links or blocks 65 are placed between the cutting tooth links and are preferably somewhat narrower than the latter, and the front edge thereof has a drag tooth 67 thereon. The links are connected together so as to form a continuous chain saw extending in the channels of the guide bars of the frame, the center links or blocks having their backs in contact with the guide rib 10 and the periphery of the guide ribs of the wheels, the broader cutting tooth links having their backs or rear edges in contact with the shoulders 11 and 12 and with the peripheries of the wheels at opposite sides of the circumferential guide ribs.

In order to steadily hold the saw frame when the saw is in action the frame is provided with a hollow guide member 68 of tubular form which is secured at one end portion to the side of the head stock near the adjacent end of the blade 9 by means of a clamp 69, the opposite end of the member being secured to the housing part 37 by means of bolts 70, and a stop bar or rod 71 is arranged adjustably in the member 68 so as to be projected therefrom, and when not in use is retained in the member by means of a spring catch 72 connected to the member and adapted to engage the outer end of the rod. The rod may be projected and held against the side of a tree or a log as an abutment to resist the tendency of the saw teeth when cutting to move the frame backward across the log.

In order to drive the saw most economically the shaft 7 which projects from the head stock is provided with a crank disk 73 having a crank pin 74 thereon. A bed plate 75 is secured to the corresponding side to the head stock and it has two housings 76 and 77 thereon adapted to contain either compressed air or steam, and two cylinders 78 and 79 are mounted on the front face of the housings so as to oscillate, each cylinder having a supporting trunnion 80, two piston rods 81 and 82 being movable in the cylinders and having each a piston 83 on its inner end, the outer ends of the rods being connected to the crank pin 74. The cylinders are arranged so that one is approximately parallel with the backing blade 9 and the other approximately at right angles thereto, so that the saw may always be started by either one or the other of the pistons. A supply hose 84 to conduct compressed air is employed and provided with a valve 85 from which extends two branch pipes 86 and 87 to conduct the air to the two housings or air chests, for supplying the two cylinders respectively, it being understood that suitable ports are provided for admission of the air to the cylinders at proper periods and to permit exhaust as is required. Oscillating engines of the above mentioned character being well known require no further description in detail.

In practical use the saw frame is placed in horizontal position and may rest on trestles or on timbers a suitable height from the ground with the backing blade 9 holding the chain saw against a standing tree, and the rod 71 is moved out so as to be in contact with the side of the tree. The engine is then started while two attendants gently push the saw against the tree until the operation is accomplished. When the timber is lying at length upon the ground the saw frame is held uprightly with the saw upon the timber or log, and the rod 71 is permitted to descend against the side of the log to the ground and is received back again into its inclosing member while the saw works downward through the log. The machine may be conveniently used also at sawmills for cutting up logs into conveniently short lengths, and obviously may be operated by means of steam when it is more convenient or desirable to supply steam than compressed air.

Having thus described the invention, what is claimed as new is:—

1. In a portable saw, the combination of a head stock, a backing blade secured to the head stock, a tail stock secured to the blade and comprising two plates having each a guideway therein, two journal boxes adjustably mounted in the guideways, a driving wheel rotatably mounted in the head stock, a main frame part fixedly secured to the head stock, an adjustable frame part having one end portion adjustably guided between the two plates of said tail stock, a shaft extending through said end portion and journaled in said boxes, a guide wheel secured to said shaft, means for adjustably connecting the opposite end of said adjustable frame part to said main frame part, and a chain saw extending about said wheels and guided in said two frame parts.

2. In a portable saw, the combination of a head stock, a shaft rotatable in the head stock, a driving wheel secured to the shaft, a backing blade secured to the head stock, a tail stock secured to said backing blade, a main frame part secured to the head stock, an adjustable frame part adjustably connected with said tail stock and also with said main frame part and having two guide wheels mounted therein, and a chain saw extending about said wheels and guided by said frame parts.

3. In a portable saw, the combination of a head stock, a backing blade and a tubular frame member secured at one end thereof to one end portion of the head stock, the said member being at right angles to the blade, a driving wheel mounted in the head stock, a frame part secured at one end to the opposite end portion of the head stock and extending obliquely to and secured to the opposite end of the tubular frame member, a tail stock secured to the opposite end of the backing blade, and a chain saw extending about the wheels.

4. In a portable saw, the combination of a head stock, a driving wheel rotatably mounted in the head stock, two frame plates secured to the head stock, a guide bar secured between the two plates and having a longitudinal channel therein, a guard extending over and covering the channel and detachably secured to opposite sides of the guide bar, and a chain saw extending about the driving wheel and through said channel under said guard.

5. In a portable saw, the combination of a frame comprising a housing having a guard thereon, two longitudinally channeled guide bars secured at one end to different portions of the housing, a guide wheel mounted in the housing under the guard thereof, and two guards detachably secured to the two guide bars respectively and extending over the channel therein and to the guard of the said housing, with a chain saw extending over the guide wheel under the guard of said housing and extending also through the channels of said guide bars and under said two guards.

6. In a portable saw, the combination of a frame comprising a housing having a guard thereon, a curved arch guide wheel mounted in and inclosed by the housing under said guard, a guide bar having a channel therein and having also a projection that is adjustably secured to the housing, and a guard detachably secured to the guide bar and covering said channel and telescopically connected with the guard of the housing, with a chain saw extending over the guide wheel through said channel and under said guards.

7. In a portable saw, a head stock comprising two parts having each a handle ring thereon and secured together, each part having an offset portion, and a hollow frame member secured to said parts and extending away obliquely thereto, said member serving as a handle and also a saw guide and guard, in combination with a driving wheel mounted between said offset portions, and a chain saw extending about the wheel and through said frame member.

8. In a portable saw, the combination of a head stock, a frame member secured to the head stock and extending obliquely therefrom, a guide member fixedly secured to the head stock and also to said frame member, and a stop bar movably mounted in said guide member.

In testimony whereof, I affix my signature in presence of two witnesses.

THOMAS O. TAGGART.

Witnesses:
E. T. SILVIUS,
J. H. GARDNER.